(12) United States Patent
Bonhag et al.

(10) Patent No.: US 8,678,443 B2
(45) Date of Patent: Mar. 25, 2014

(54) CONNECTING PIECE FOR A CLAMPING CONNECTOR

(75) Inventors: Ehrenfried Bonhag, Schwabach (DE); Karl-Heinz Haunstetter, Fürth (DE)

(73) Assignee: Rehau AG + CO, Rehau (DE)

( * ) Notice: Subject to any disclaimer, the term of this patent is extended or adjusted under 35 U.S.C. 154(b) by 656 days.

(21) Appl. No.: 12/920,464

(22) PCT Filed: Mar. 5, 2009

(86) PCT No.: PCT/EP2009/001557
§ 371 (c)(1),
(2), (4) Date: Nov. 11, 2010

(87) PCT Pub. No.: WO2009/109385
PCT Pub. Date: Sep. 11, 2009

(65) Prior Publication Data
US 2011/0042941 A1    Feb. 24, 2011

(30) Foreign Application Priority Data
Mar. 7, 2008    (DE) .................... 20 2008 003 353 U

(51) Int. Cl.
*F16L 35/00*    (2006.01)
(52) U.S. Cl.
USPC ............................ 285/39; 285/239; 285/242
(58) Field of Classification Search
USPC ............. 285/38, 39, 242, 361, 382, 396, 402, 285/239, 397
See application file for complete search history.

(56) References Cited

U.S. PATENT DOCUMENTS

2007/0007761 A1    1/2007  Nisel
2007/0200340 A1 *  8/2007  Poll .............................. 285/55

FOREIGN PATENT DOCUMENTS

| DE | 295 13 105 U1 | 10/1995 |
| DE | 196 51 817 A1 | 6/1998 |
| DE | 197 41 641 A1 | 3/1999 |
| GB | 2 127 509 A | 4/1984 |
| WO | WO 2007/019270 | 2/2007 |

OTHER PUBLICATIONS

International Search Report, Jul. 15, 2009.

* cited by examiner

*Primary Examiner* — James Hewitt
*Assistant Examiner* — Jay R Ripley
(74) *Attorney, Agent, or Firm* — Da Vinci Partners LLC; John Moetteli

(57) ABSTRACT

A clamping connector for pipes and/or tubes (2) made of a polymer material has at least two pipe/tube connecting elements (3). At least one connecting element (3) includes a plug-in region (5) which is provided with peripheral ribs (4, 4a, 4b), for slidingly connecting to each of a pipe and/or tube end (2a) against which a flange projection (6) abuts. At least one tooth-like projection (7) is disposed on the side of the flange projection (6), which is located opposite to the peripheral ribs (4, 4a, 4b). A free space (8) is provided between the flange projection (6) and the at least one tooth-like projection (7). A plurality of tooth-like projections (7) are disposed so as to be distributed across a periphery of the polymer connecting piece (4). In addition, gaps (9) are disposed between the individual tooth-like projections (7). In addition, the object is solved by means of a clamping connector for pipes and/or tubes (2) made of a polymer material comprising a polymer connecting piece (1) as described above.

18 Claims, 4 Drawing Sheets

CONNECTING PIECE FOR A CLAMPING CONNECTOR

CROSS REFERENCE TO RELATED APPLICATIONS

This application is the National Stage of International Application No. PCT/EP2009/001557, filed Mar. 5, 2009, which claims benefit under 35 USC §119(a), to German patent application Ser. No. 20 2008 003 353.5, filed Mar. 7, 2008.

BACKGROUND OF THE INVENTION

The invention relates to a polymer connecting piece for a clamping connector for pipes and/or tubes made of a polymer material comprising at least two pipe/tube connecting elements, wherein at least one connecting element includes a plug-in region, which is provided with peripheral ribs, for sliding open in each case a pipe and/or tube end, and to each of which a flange projection connects.

DE 3836124 C3 describes a two-piece metallic clamping connector for pipes and tubes made of a polymer material comprising a connecting piece, which is formed as a pipe sleeve. The pipe connecting piece includes a plug-in region, which is to be inserted into the pipe end and which is provided with peripheral ribs. The plug-in region is furthermore limited in axial direction by means of a flange projection, which serves as stop for the pipe, which is to be slid open.

Even though these metallic connecting pieces are suitable to establish a liquid-tight and permanent connection for plastic pipes and tubes, their high weight and the high costs prove to be disadvantageous.

DE 295 13 105 U1 attempts to overcome this problem by means of a polymer connecting piece. This connecting piece consists of a plug-in region, which is to be inserted into a pipe/tube end and to which a flange projection connects, which consists of tooth-like projections disposed on the periphery thereof and in the case of which gaps, which extend to the peripheral level of the plug-in region, are disposed between the individual tooth-like projections.

It turned out that further material savings downstream from the flange area are possible as a result of the use of a polymer connecting piece. As a result, the flange projection is stressed in response to the establishing of the connection to such an extent that cracks can form in this area. This can also lead to leaks in the connection.

What is needed is a means of further reducing the material use for a polymer connecting piece and to avoid damage to the flange projection when establishing the connection. At the same time, the outer form of the connecting piece should only negligibly deviate from the known metallic connecting pieces.

SUMMARY OF THE INVENTION

According to the invention, this object is solved by means of a polymer connecting piece for a clamping connector for pipes and/or tubes made of a polymer material has at least two pipe/tube connecting elements. At least one connecting element includes a plug-in region which is provided with peripheral ribs, for slidingly connecting to each of a pipe and/or tube end against which a flange projection abuts. At least one tooth-like projection is disposed on the side of the flange projection, which is located opposite to the peripheral ribs. A free space is provided between the flange projection and the at least one tooth-like projection. A plurality of tooth-like projections are disposed so as to be distributed across a periphery of the polymer connecting piece. In addition, gaps are disposed between the individual tooth-like projections.

In addition, the object is solved by means of a clamping connector for pipes and/or tubes made of a polymer material comprising a polymer connecting piece as described above, further including a sliding sleeve, which can be moved axially with respect to the pipe/tube axis and which can be slid across the pipe/tube end with the plug-in region of the connecting piece, which is inserted into the pipe/tube end in order to establish a clamping connection. The outer diameter of the pipe/tube without the inserted plug-in region is essentially the same size as an addendum circle diameter of the at least one tooth-like projection.

BRIEF DESCRIPTION OF THE DRAWINGS

The invention will now be described in detail by means of non-limiting exemplary embodiments:

FIG. 2c shows a three-dimensional view of the polymer connecting piece of FIG. 2a.

DETAILED DESCRIPTION OF THE PREFERRED EMBODIMENT(S)

Figure 1:
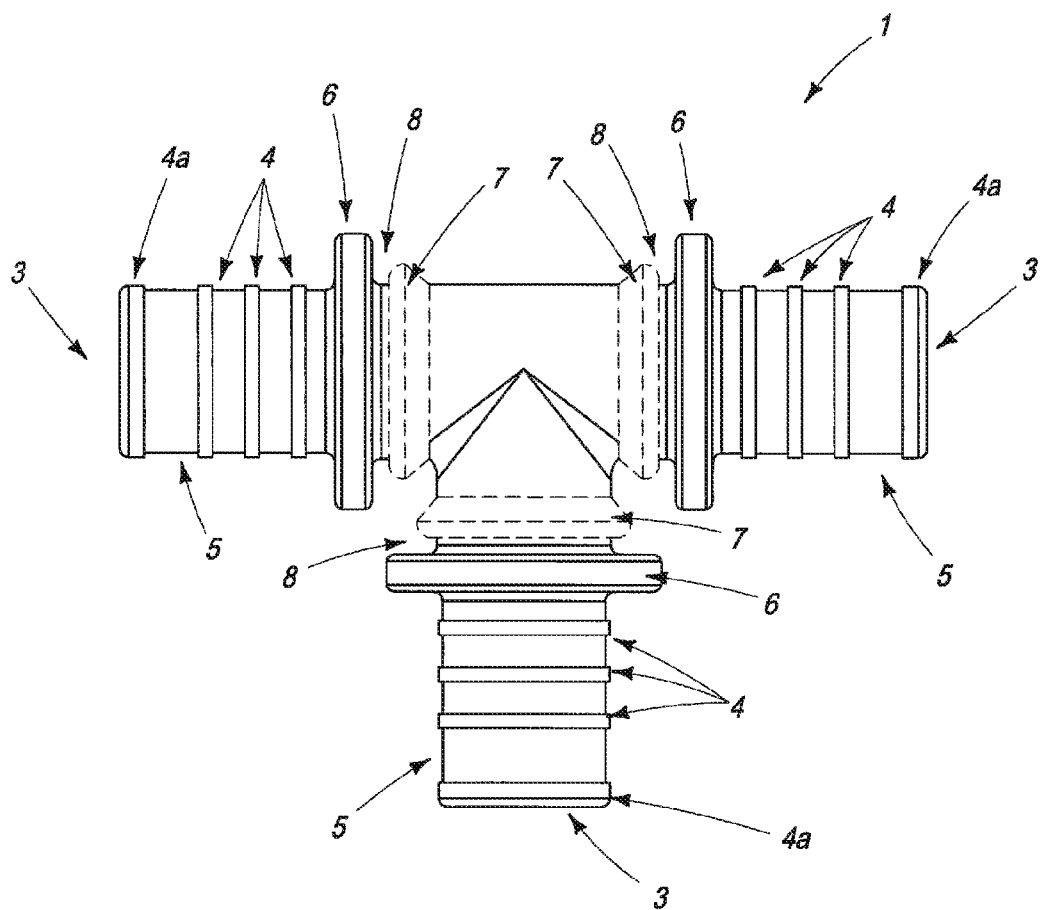
FIG. 1 shows a polymer connecting piece according to the invention comprising a tooth-like projection.

With the invention, the disadvantages of the state of the art are avoided in that at least one tooth-like projection is disposed on the side of the flange projection, which is located opposite to the peripheral ribs.

A tool, which consists of two movable tool jaws, which are disposed parallel to one another, is used for establishing a clamping connection consisting of a polymer connecting piece according to the invention, a pipe/tube and a sleeve, which can be slid above the plug-in region of the connecting piece and the pipe/tube end. One of the tool jaws is thereby attached downstream from the flange projection of the polymer connecting piece and one is attached to the sleeve, which is slid onto the pipe/the tube. By closing the two jaws, the sleeve is slid across the plug-in region of the polymer connecting piece comprising the pipe/tube end, which is attached thereon, thus creating a liquid-tight connection.

By arranging at least one tooth-like projection on the side of the flange projection, which is located opposite to the peripheral ribs, it is possible to create a support for the one tool jaw for to establishing the clamping connection, wherein the support diameter corresponds to the diameter of the pipe and/or tube, which is to be connected.

It turned out that this diameter adaptation insures that essentially only an axial displacement of the sleeve takes place and that the flange projection is stressed in a very even manner.

It is further advantageous when free space is provided between the flange projection and the at least one tooth-like projection. It can thus be attained that the flange projection can deform elastically under the application of force when the clamping connection is established and that crack formation in the transition area of the tooth-like projection and the flange projection is prevented.

A simple and cost-efficient option for further reducing the material use is that a plurality of tooth-like projections are disposed so as to be distributed across the periphery and that gaps are disposed between the individual tooth-like projections. A revolving embodiment of the projection is thus not necessary. It turned out in this context that it is particularly advantageous to distribute 4 to 16, in particular 8, tooth-like projections over the periphery.

It also turned out to be advantageous to evenly distribute the tooth-like projections over the periphery. This arrangement makes it possible for a secure support and positioning of the tool jaw to exist in response to any accessibility of the connecting location and thus of the polymer connecting piece when establishing the clamping connection.

In a further advantageous embodiment, the tooth-like projections include additional functionality. It turned out that, mainly in the case of small dimensions of the pipes/tubes, there is no space on the periphery between the tooth-like projections for the application of the date indications, which are required by standards, for identifying the time of production of the connecting piece. So as to nonetheless place them according to standard, it was recognized that they themselves can be formed as tooth-like projections. Other information can furthermore also be integrated on the tooth-like projections.

It can be advantageous for the contour of the tooth-like projections on the side, which is beveled to the respective plug-in region axis and which faces away from the flange projection, to drop to a diameter of the size of the plug-in region. By means of this beveled design, it is possible, in particular in the case of connecting pieces whose connecting elements do not include a common axis, to securely position the tool jaw, because the bevel creates a type of guide, which allows for the tool jaw to glide on the projections.

According to a preferred embodiment of the invention, at least two connecting elements are disposed with respect to one another at an angle of less than 180°. This thus creates connecting pieces, which correspond to bends, in particular rectangular deflections or branch pipes, in particular T components. It can be advantageous thereby that the surface area of least one of a plurality of tooth-like projections in the case of such connecting pieces is formed so as to be smaller than the other one. Preferably, this reduced tooth-like projection is disposed in the area between two connecting elements. It is thus possible to move the flange projections closer to one another and to thus reduce the available space. However, due to the fact that the tooth-like projection in the area between two connecting elements would then reach into the area of curvature of the connecting piece, it was recognized that a reduction of the tooth-like projection disposed at that location is advantageous. A stress peak thus does not occur in this area and, at the same time, the tool jaw can be positioned securely. The reduction of the tooth-like projection can be attained in this area between the connecting elements in particular by means of a steeply dropping contour on the side facing away from the flange projection.

The invention furthermore relates to a clamping connection for pipes/tubes made from a polymer material comprising a polymer connecting piece according to the invention and a sliding sleeve, which can be moved axially to the pipe/tube axis.

The clamping connector is characterized in that the outer diameter of the pipe/tube without the inserted plug-in region is essentially the same size as a tip circle diameter of the at least one tooth-like projection. By means of this geometric form it is possible that the tool jaw used for establishing the clamping connection is oriented parallel to the flange projection and that force is applied evenly. It is thus possible in an advantageous manner to establish a liquid-tight clamping connection, while avoiding the formation of cracks in the area of the flange projection.

FIG. 1 illustrates a polymer connecting piece (1) according to the invention. This connecting piece (1) is formed as T connection with three connecting elements (3), wherein all three connecting elements (3) have a plug-in region (5). In this exemplary embodiment, the plug-in regions (5) in each case include four peripheral ribs (4, 4a), which are not evenly distributed across the length of the plug-in region (5). However, it is also possible to provide for a different number and for a different distribution of the peripheral ribs (4, 4a).

A flange projection (6) connects in each case to the plug-in region regions (5). The diameter thereof is embodied so as to be greater than the plug-in region (5) and the peripheral ribs (4, 4a), so that a pipe, which is slid onto the plug-in regions (5), or a tube (2), which is slid on, can be pushed with its front face up towards the flange projection (6). It is thus possible to easily check whether the plug-in region (5) is correctly inserted into the pipe/the tube (2).

A tooth-like projection (7), which extends across the entire periphery, is in each case disposed on the side of the flange projections (6) facing away from the plug-in region regions (5). Free space (8), which separates the tooth-like projections (7) from the flange projections (6), is disposed between the flange projections (6) and the tooth-like projection (7). Due to the design, the flange projection (6) can deform elastically when the clamping connection is established by means of a tool (13) and a stress crack does not occur at the junction between flange projection (6) and tooth-like projection (7).

In this exemplary embodiment, the tooth-like projections (7) are beveled on the side facing away from the corresponding flange projection (6). It is attained with this that, due to the beveled design, the tool jaw (14), which is disposed downstream from the flange projection (6), glides onto the tooth-like projection (7) and an optimal positioning of the tool jaw (14) thus takes place when the clamping connection is established.

Figures 2A, 2B:
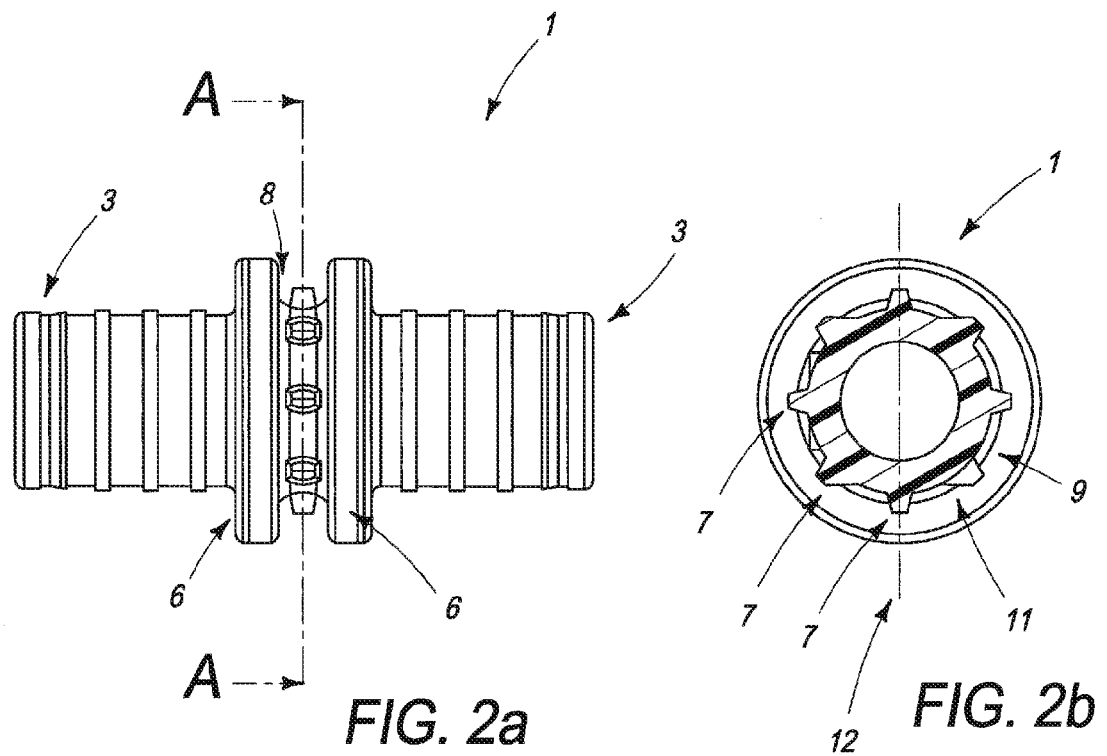
FIG. 2a shows a polymer connecting piece according to the invention comprising a plurality of tooth-like projections in the view.
FIG. 2b shows a section through the polymer connecting piece according to the invention of FIG. 2a along line A-A.
Figure 2C:
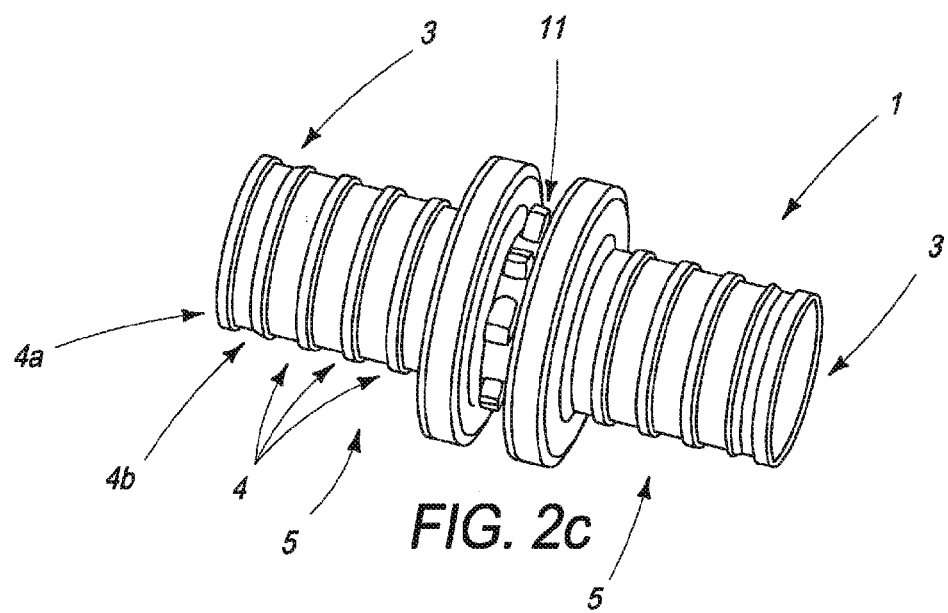

FIGS. 2a, 2b and 2c illustrate a further embodiment of a connecting piece (1) according to the invention. This straight polymer connecting piece (1) includes two connecting elements (3). In this exemplary embodiment, the two connecting elements (3) are also formed as plug-in region regions (5). However, it also lies within in the context of the invention that a connecting element is formed as a threaded connection, so that a screw connection with a further component can take place on this side.

Both plug-in regions (5) include five peripheral ribs (4, 4a, 4b), wherein the peripheral rib (4a), which is farthest away from the flange projection (6), is formed so as to be wider than all other peripheral ribs (4, 4b). Except for the peripheral rib (4b), which is adjacent to the peripheral rib (4a) located farthest away from the flange projection (6), all of the peripheral ribs (4, 4a) are formed as rings in this exemplary embodiment. On the side facing in the direction of the flange projection (6), this peripheral rib (4b) is formed with a larger diameter than on the other side, thus resulting in a type of sawtooth. A good anchoring of the pipe/tube (2) is possible with this design after the sliding sleeve (10) is slid on and attached.

Due to the fact that both connecting elements (3) are formed as plug-in regions (5), two flange projections (6) are also necessary to fix the one tool jaw (14, 14a) as a counter bearing surface. To shorten the overall length, only one tooth-like projection (7) is necessary between the two flange projections (6), because it can serve as a support for a tool jaw (14a) when establishing both clamping connections.

Provision is made in this embodiment as well for a free space (8) between the flange projections (6) and the tooth-like projection (7).

The tooth-like projection (7) itself is formed such that it consists of a plurality of individual tooth-like projections (7), which are disposed around the periphery of the connecting piece (1). As can be seen in FIG. 2b, the tooth-like projections (7) are distributed evenly over the periphery. A gap opening (9), which serves as separation of the individual tooth-like projections (7), is disposed between the individual tooth-like projections (7).

Identifications for specifying the material from which the connecting piece (1) is made, information relating to the production date, can be disposed in the available gaps (9) by applying so-called date indication calendar clocks or the like.

Due to the fact that this polymer connecting piece (1) is most often produced by means of injection molding, a mold parting line (12) is necessary, which facilitates release of the connecting piece (1) from the mold. So as not to have to design the injection molding tool geometry to be unnecessarily complicated, undercuts starting at the mold parting line (12) should not be present. This can occur in particular in the case of the individual tooth-like projections (7). The provision of demolding bevels (11) represents a possible solution.

By arranging eight tooth-like projections (7) above the periphery of the connecting piece (1), the tool jaw (14, 14a) is held securely in response to any installation position and the material, which is otherwise required between the flange projections (6), can simultaneously be reduced. This material reduction also makes it possible to attain almost even wall thicknesses via the connecting piece (1), which has a positive effect on the stress distribution after production by means of injection molding.

Figure 3A:
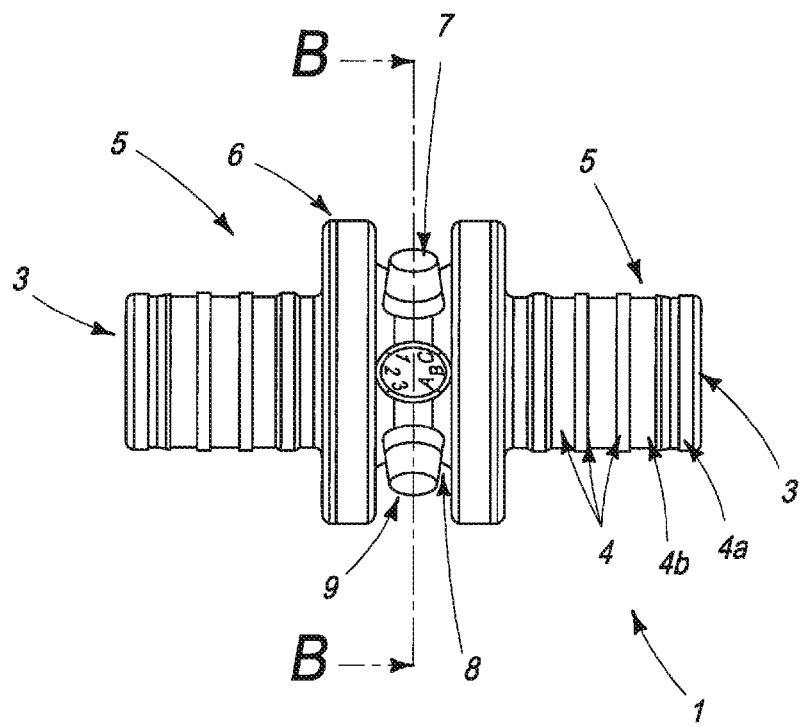
FIG. 3a shows a polymer connecting piece according to the invention comprising a tooth-like projection with additional functionality.
Figure 3B:
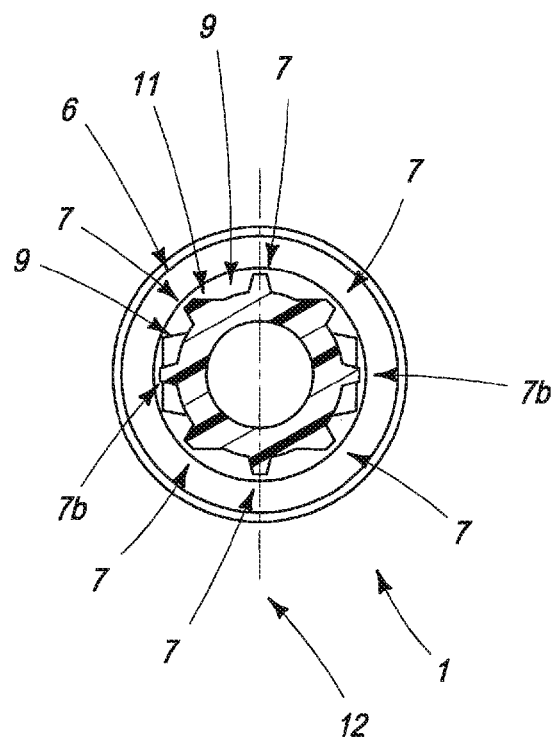
FIG. 3b shows a section through the polymer connecting piece according to the invention of FIG. 3a along line B-B.

FIGS. 3a and 3b show a further polymer connecting piece (1). To avoid needless repetition, only the differences as compared with the second embodiment are discussed now. In the case of this connecting piece (1), the diameter of the connecting piece (1) is smaller than in FIGS. 2a, 2b, 2c, such that the length of the periphery is not sufficient to accommodate all identifications, in particular the date indications in the gaps (9) between the tooth-like projections (7).

For this reason, it was recognized according to the invention that the tooth-like projections (7) can also be equipped with additional functions. In the exemplary embodiment of FIGS. 3a and 3b, two tooth-like projections (7b) are provided with additional functions. These are formed as date indications, so that the identification of the production date of the connecting piece (1) can be attached. The diameter, up to which the date indications project, corresponds to the diameter of the other tooth-like projections (7), so that the tool jaw (14) can also be positioned securely on the date indications.

Figure 4:
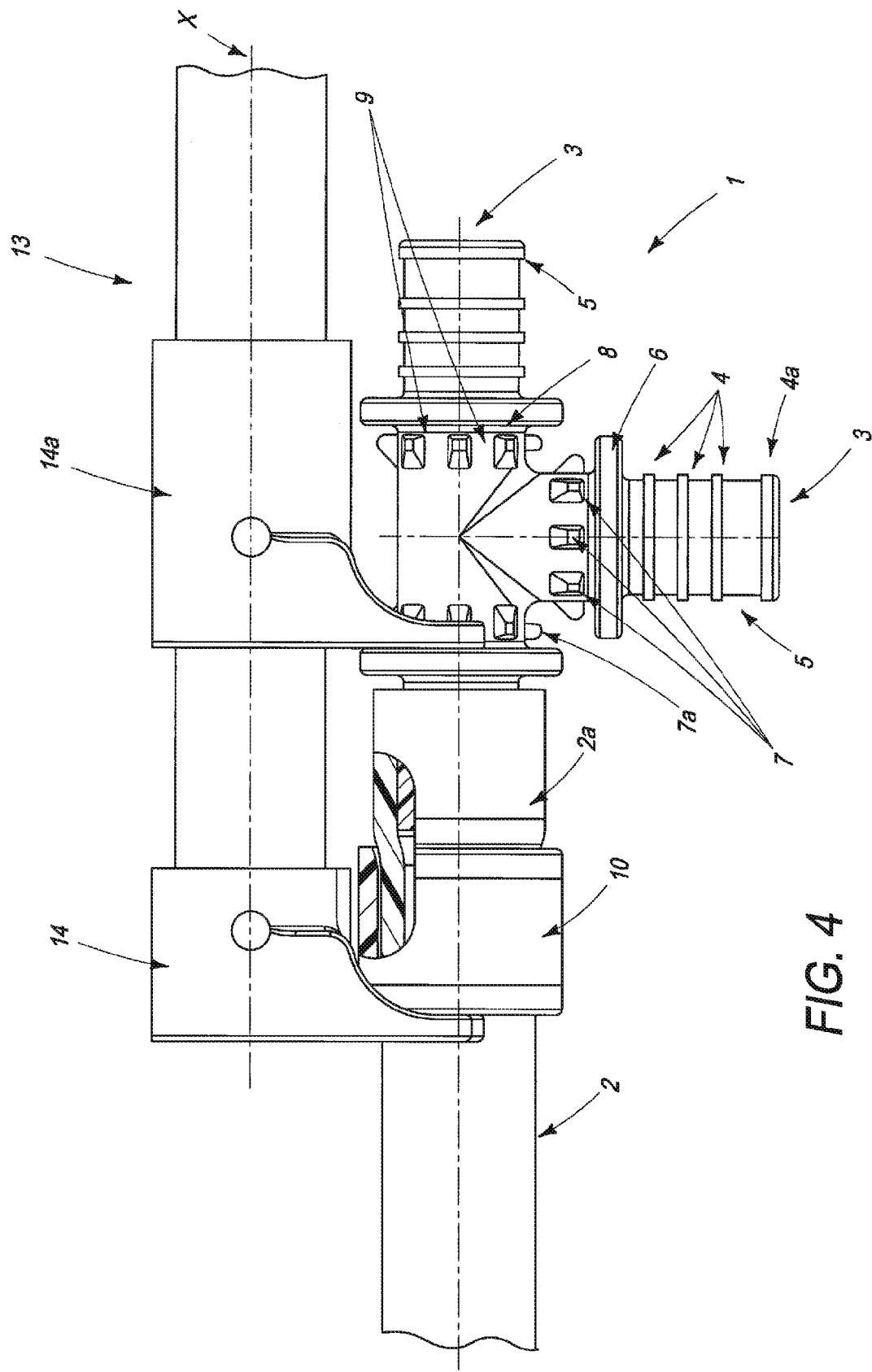
FIG. 4 shows a schematic view of the establishing of a clamping connection according to the invention with tool.

FIG. 4 schematically illustrates the establishment of a clamping connection comprising a polymer connecting piece (1) according to the invention, a pipe/tube (2), and a sliding sleeve (10) by means of a tool (13). To avoid needless repetition, only the differences from the afore-mentioned exemplary embodiments are discussed now.

The tool (13), illustrated in this FIG. 4, is thereby only drawn as a section of the two tool jaws (14, 14a), which are disposed parallel to one another. When establishing the clamping connection, a tool jaw (14) is disposed so as to be fixed and the other tool jaw (14a) is disposed so as to be movable along an axis (X) on the tool (13). The tool jaws (14, 14a) are formed in a forked manner, so that an attachment onto the pipe/the tube (2) and the connecting piece (1) is possible.

To establish the clamping connection, the sliding sleeve (10) must first be attached to the end region of the pipe/tube. Thereafter, the pipe/tube end (2a) is widened such that the inner diameter of the pipe/tube end (2a) is greater than the outer diameter of the plug-in region (5) of the connecting piece (1). The pipe/tube end (2a) can be guided across the plug-in region (5) only in this manner. To establish a secure connection, the pipe/tube end (2a) must thereby be slid onto the flange projection (6) as far as possible.

Subsequently, the tool jaws (14, 14a) are positioned and the sliding sleeve (10) is slid up to the flange projection (6) by reducing the distance of both tool jaws (14, 14a) across the pipe/tube end (2a) with the plug-in region (5), which is disposed in the interior. The establishing of the clamping connection is thus finalized.

In response to the reduction of the distance between the two tool jaws (14, 14a), high forces are required. On the one hand, they cause the movement of the sliding sleeve (10) and, on the other hand, they must be accommodated via the flange projection (6) so as to adjust a balance of forces. So as to avoid damages, in particular at the transition of the flange projection (6) to the base body of the connecting piece (1), an application of force is necessary, which is as even as possible. This is only possible via a virtually plane abutting of the tool jaw (14, 14a) on the flange projection (6). Due to the fact that both of the tool jaws (14, 14a) are disposed parallel to one another, it was recognized that the outer diameter of the pipe/tube (2), which is not widened, and the contact surface diameter of the tool (13) on the connecting piece (1) should be virtually identical. However, this results in a greater wall thickness between flange projections (6), which has a negative impact on the stress situation in response to the injection molding and which means an unnecessary use of material.

To solve this problem, tooth-like projections (7), which are separated from the flange projection (6) by means of free space (8), are disposed downstream from the flange projection (6). In the case of this connecting piece (1), which is illustrated in FIG. 4, the distance of the two connecting elements (3) located opposite one another, can also be shortened in that a tooth-like projection (7a) having a smaller surface area, is disposed preferably on both sides in that area between these connecting elements (3) located opposite one another, in which the third connecting element (3) is disposed. It was recognized that the tooth-like projection (7a) in this area must be formed so as to be smaller, so that a stress concentration does not arise in the area of the transition and so that reliable operation can be ensured.

The invention claimed is:

1. A polymer connecting piece (1) for a clamping connector for pipes and/or tubes (2) made of a polymer material comprising at least two pipe/tube connecting elements (3), wherein at least one connecting element (3) includes a plug-in region (5) which is provided with peripheral ribs (4, 4a, 4b), for slidingly connecting to each of a pipe and/or tube end (2a) against which a flange projection (6) abuts, wherein a plurality of tooth-like projections (7) are disposed on the side of the flange projection (6) to create a support for a tool used for establishing a clamping connection, which are located opposite to the peripheral ribs (4, 4a, 4b), wherein a free space (8) is provided between the flange projection (6) and the tooth-like projections (7), wherein the plurality of tooth-like projections (7) are disposed so as to be distributed across a periphery of the polymer connecting piece (4) and wherein gaps are disposed between the individual tooth-like projections (7).

2. The polymer connecting piece (1) according to claim 1, wherein the contour of the tooth-like projections (7) on the side, which is beveled with respect to the respective plug-in region axis (X) and which faces away from the flange projection (6), decreases in size to a diameter of the size of the plug-in region (5).

3. The polymer connecting piece (1) according to claim 1, wherein at least two connecting elements (3) are disposed at an angle of less than 180° to one another.

4. The polymer connecting piece (1) according to claim 3, wherein provision is made for a plurality of tooth-like projections (7) and that at least one is formed so as to have a smaller surface area than the at least one other tooth-like projection (7).

5. The polymer connecting piece (1) according to claim 1, wherein the contour of the tooth-like projections (7) on the side, which is beveled with respect to the respective plug-in region axis (X) and which faces away from the flange projection (6), decreases in size to a diameter of the size of the plug-in region (5).

6. The polymer connecting piece (1) according to claim 1, wherein at least two connecting elements (3) are disposed at an angle of less than 180° to one another.

7. The polymer connecting piece (1) according to claim 1, wherein a tooth-like projection (7a) is formed to perform multiple functions.

8. The polymer connecting piece (1) according to claim 1, wherein a tooth-like projection (7a) is formed as a date indicator.

9. The polymer connecting piece (1) according to claim 8, wherein the contour of the tooth-like projections (7) on the side, which is beveled with respect to the respective plug-in region axis (X) and which faces away from the flange projection (6), decreases in size to a diameter of the size of the plug-in region (5).

10. The polymer connecting piece (1) according to claim 1, wherein the tooth-like projections (7) are disposed so as to be evenly distributed over the periphery.

11. The polymer connecting piece (1) according to claim 1, wherein a tooth-like projection (7a) is formed as a date indicator.

12. The polymer connecting piece (1) according to claim 10, wherein the contour of the tooth-like projections (7) on the side, which is beveled with respect to the respective plug-in region axis (X) and which faces away from the flange projection (6), decreases in size to a diameter of the size of the plug-in region (5).

13. The polymer connecting piece (1) according to claim 10, wherein at least two connecting elements (3) are disposed at an angle of less than 180° to one another.

14. The polymer connecting piece (1) according to claim 1, wherein eight tooth-like projections (7) are disposed so as to be distributed across the periphery.

15. The polymer connecting piece (1) according to claim 1, wherein a tooth-like projection (7a) is formed as a date indicator.

16. The polymer connecting piece (1) according to claim 14, wherein the contour of the tooth-like projections (7) on the side, which is beveled with respect to the respective plug-in region axis (X) and which faces away from the flange projection (6), decreases in size to a diameter of the size of the plug-in region (5).

17. The polymer connecting piece (1) according to claim 14, wherein at least two connecting elements (3) are disposed at an angle of less than 180° to one another.

18. A clamping connector for pipes and/or tubes (2) made of a polymer material comprising a polymer connecting piece (1) according to claim 1, comprising a sliding sleeve (10), which can be moved axially with respect to the pipe/tube axis and which can be slid across the pipe/tube end (2a) with the plug-in region (3) of the connecting piece (1), which is inserted into the pipe/tube end (2a) in order to establish a clamping connection, wherein the outer diameter of the pipe/tube (2) without the inserted plug-in region (3) is essentially the same size as an addendum circle diameter of the at least one tooth-like projection (7).

* * * * *

UNITED STATES PATENT AND TRADEMARK OFFICE
CERTIFICATE OF CORRECTION

| | | |
|---|---|---|
| PATENT NO. | : 8,678,443 B2 | Page 1 of 1 |
| APPLICATION NO. | : 12/920464 | |
| DATED | : March 25, 2014 | |
| INVENTOR(S) | : Ehrenfried Bonhag et al. | |

It is certified that error appears in the above-identified patent and that said Letters Patent is hereby corrected as shown below:

In the Specification

In Col. 1, line 59, replace the phrase "has at least two" with --having at least two--

In Col. 4, line 51, replace the phrase "within in the context of the invention that" with --within the context of the invention that--

Signed and Sealed this
Third Day of February, 2015

Michelle K. Lee
*Deputy Director of the United States Patent and Trademark Office*